May 5, 1959 C. A. NESSETH 2,885,098
BALE CONVEYOR
Filed Aug. 16, 1956 3 Sheets-Sheet 1
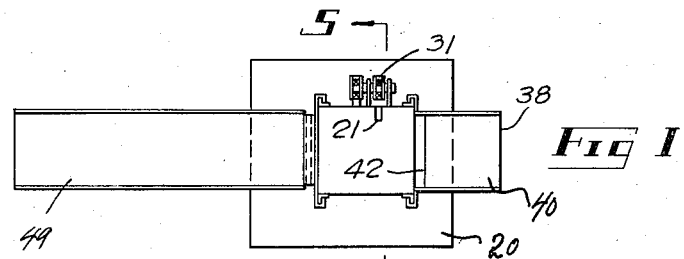
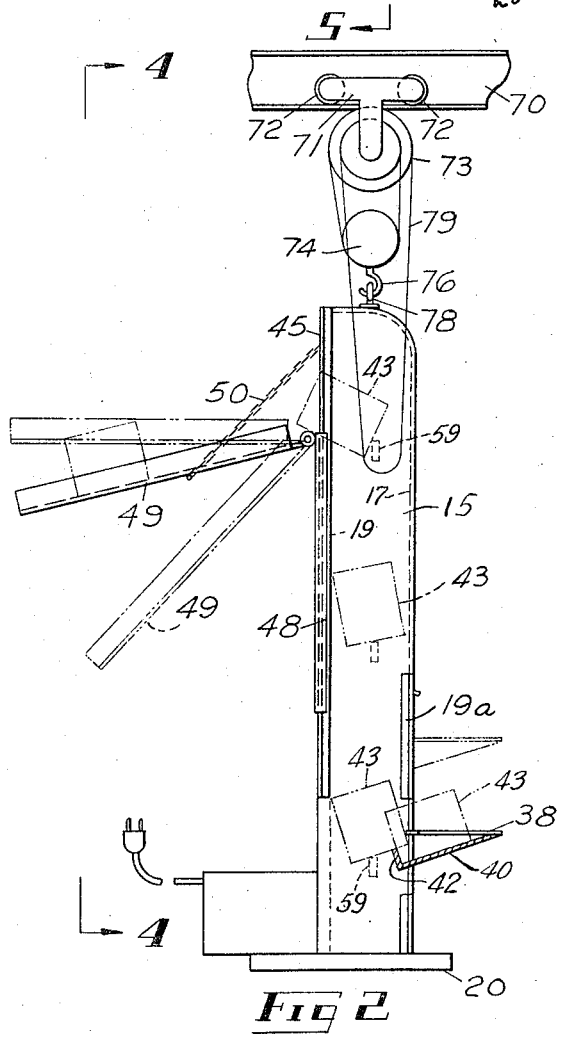
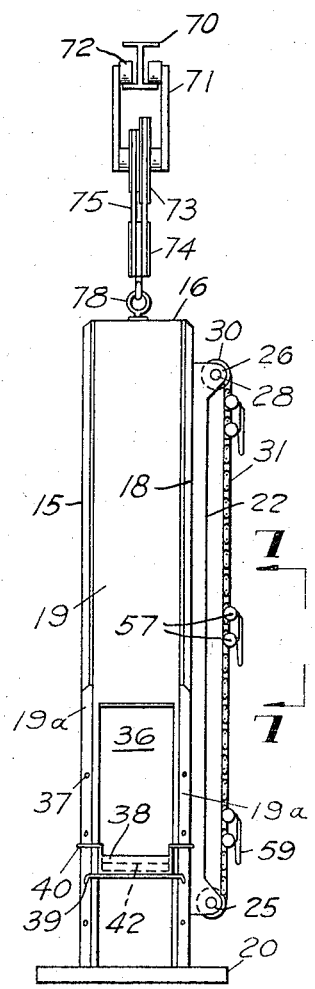
INVENTOR.
CLIFFORD A. NESSETH
BY
Dennely, Mentag & Harrington
ATTORNEYS May 5, 1959
C. A. NESSETH
2,885,098
BALE CONVEYOR
Filed Aug. 16, 1956
3 Sheets-Sheet 2
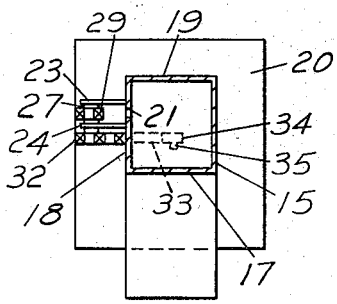
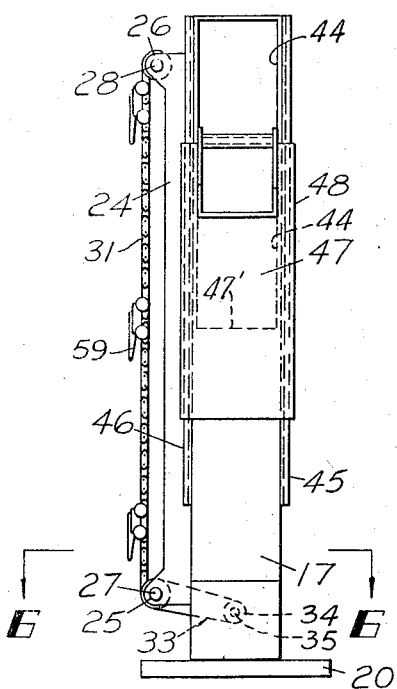
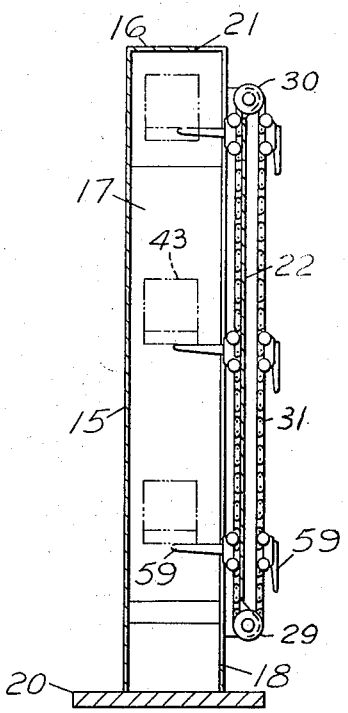
INVENTOR.
CLIFFORD A. NESSETH
BY
ATTORNEYS May 5, 1959 C. A. NESSETH 2,885,098
BALE CONVEYOR
Filed Aug. 16, 1956 3 Sheets-Sheet 3

INVENTOR.
CLIFFORD A. NESSETH
BY
Donnelly, Mentag + Harrington
ATTORNEYS

United States Patent Office 2,885,098
Patented May 5, 1959

2,885,098

BALE CONVEYOR

Clifford A. Nesseth, Brimley, Mich.

Application August 16, 1956, Serial No. 604,362

1 Claim. (Cl. 214—95)

My invention relates to a new and useful improvement in a conveyor adapted for conveying articles such as bales, bundles and the like, to an elevated position. The invention is particularly useful in conveying baled hay to the loft or mow in which it is to be stored.

It is an object of the present invention to provide a conveyor of this class, simple of construction, economical of manufacture, durable, compact and highly efficient in use.

Another object of the invention is the provision of a conveyor of this class which may be mounted on a traveling support in the building in which the goods are to be stored.

Another object of the invention is the provision of a conveyor having an endless chain with material engaging lifting arms which automatically swing into non-lifting position upon initial return to the starting position.

Another object of the invention is the provision in a conveyor of this class of a receiving chute for receiving the articles after they have been conveyed, which receiving chute is so constructed and arranged that it may be adjusted to various positions of elevation and various positions of inclination.

Another object of the invention is the provision in a conveyor of this class of a receiving platform which may be adjusted to various positions of movement.

Other objects will appear hereinafter.

It is recognized that various modifications and changes may be made in the details of the structure illustrated without departing from the invention, and it is intended that the present disclosure shall be considered to be but the preferred embodiment.

Forming a part of this application are drawings in which,

Fig. 1 is a top plan view of the invention;

Fig. 2 is a side elevational view of the invention;

Fig. 3 is a front elevational view of the invention;

Fig. 4 is a rear elevational view of the invention taken on line 4—4 of Fig. 2;

Fig. 5 is a sectional view taken on line 5—5 of Fig. 1;

Fig. 6 is a sectional view taken on line 6—6 of Fig. 4;

Figure 7:
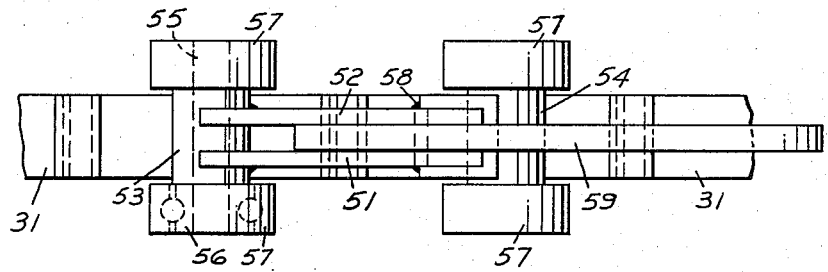
Fig. 7 is a top plan view of one of the lifting forks used in the invention.

As shown in the drawings, the invention comprises a tubular housing or tower having oppositely disposed side walls 15 and 18, a rear wall 17, a front wall 19, and a top wall 16. The side 18 is slotted from adjacent its bottom 20 and extending through the top as at 21. Mounted on the side wall 18 and extending upwardly from adjacent the bottom so as to overlie the slot 21 is a trough-shaped housing having an outside or bottom wall 22 and the side walls 23 and 24. Extending outwardly from these side walls 23 and 24 at the bottom and top thereof are the brackets 25 and 26. The bracket 25 serves to retain a bearing for a shaft 27, and the bracket 26 serves to retain a bearing for a shaft 28. Mounted on the shaft 27 is a sprocket gear 29. An idler sprocket gear 30 is mounted on the shaft 28. Traveling around the sprocket gears is an endless chain 31. The sprocket gear 29 is fixedly mounted on the shaft 27, and this shaft is driven through the pulley 32, which is driven by the belt 33 rotated by the pulley 34 on the shaft 35 of an electric motor or the like.

The front wall 19 is cut away as at 36, and formed in the flanges 19a on the sides of the front wall along the cutaway portion are openings 37. A loading platform 38 is provided at opposite sides at the inner bottom end thereof with the prongs 39, and at the inner top end thereof with the hooks 40, this loading platform having side walls or bars 41. This loading platform has at the inner end of its bottom wall an abutment in the form of an upwardly projecting flange 42.

This flange 42 serves the function of tilting the bale 43 so that when the bale 43 is placed upon the platform and moved inwardly it will remain in a tilted position, as shown in Fig. 2 so as to engage the inner surface of the rear wall 17. This loading platform is adjustably mounted on the front wall 19 by means of the hooks 40 being slidably mounted around the flanges 19a and the prongs 39 engaging a pair of the openings 37. The prongs 39 may be disengaged from the openings 37 and the hooks 40 may slide on the flanges 19a so that this loading platform may be raised or lowered.

The rear wall 17 is cut away at its upper end to provide a vertically elongate discharge opening 44. The wall 17 is provided at opposite sides with the outwardly projecting flanges 45 and 46, slidably mounted on which is a closure plate 47, this closure plate having its opposite sides formed into a U-shaped formation as at 48, so that this U-shaped formation will embrace the flanges 45 and 46. Swingably mounted on the upper end of this closure plate 47 is a chute 49 which may be adjusted to various positions of upward and downward swinging as shown in Fig. 2. A chain 50 is connected at one end to the chute 49, and at its opposite end to the flanges 45 and 46, there being a pair of these chains 50, one being positioned at one side and the other at the opposite side of the chute 49.

As the bale 43 travels upwardly of the tower, the inclining end of the bale 43 will ride over the upper edge 47' of the closure plate 47 and topple into the chute 49, from which it may be slid off.

In mounting the lifting arms or forks on the end of the chain, I provide a carriage embodying a pair of spaced apart plates 51 and 52 which carry at one of their ends a sleeve 53 and at their other end a sleeve 54. These sleeves serve as retainers for bearings for the shafts 55 which are extended therethrough and on each of which is mounted, at each end, a bearing 56, embracing which is a rotatable rim 57. The plates 51 and 52 are connected by a weld 58, or any other suitable manner, to a link of the chain 31.

Pivotally mounted on and lying between the plates 51 and 52 is the lifting arm 59 which, when swung into an operative position engages an abutment member 60 carried between plates 51 and 52. When the arm 59 swings to operative position, engagement therewith of the abutment member prevents the arm swinging further.

In operation, the driving shaft 35 would be rotated so as to rotate the gears 32 and 29, and cause a travel of the chain 31 around the lower gear 29 and the upper gear 30. The upwardly traveling part of the chain 31 would be contained within the trough-like housing formed by the trough-shaped member embodying the bottom 22.

As shown in Fig. 2 when the lifting arm travels around the lower gear, it will swing into horizontal position and project through the slot 21 formed in the wall 18. It will be noted that the slot 21 is offset from the center of the tower. Thus, upon upward travel, it would engage the bale 43 or other object which may be deposited from the loading platform 38 into the interior of the tower. Due to the fact that this slot 21 is formed toward one side of the tower, the bale will be engaged at its bottom toward the forward edge and this bale or other object will travel upwardly in an inclined position so as to engage the inner surface of the wall 17.

Figure 8:
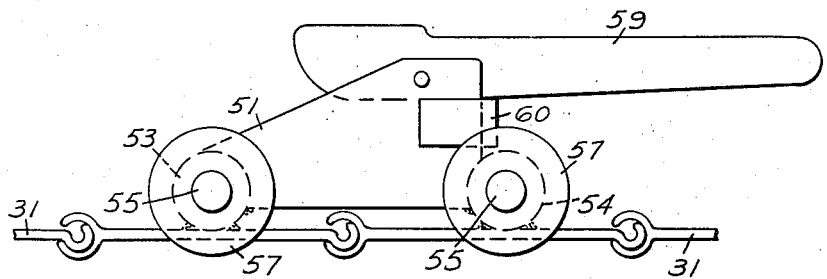
Fig. 8 is a side elevational view of the lifting fork used in the invention.
Figure 9:
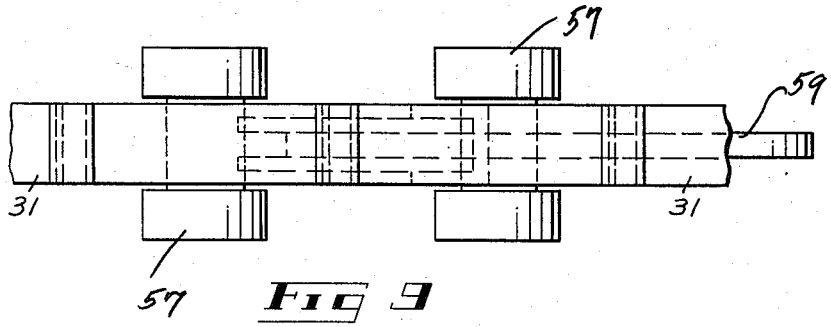
Fig. 9 is a bottom plan view of the lifting fork used in the invention.

One set of traction rollers 57 will engage the outer face of the wall 18, and the other set will engage the inner surface of the bottom or outside wall 22 of the trough-shaped housing. This is due to the fact that these rollers project on both sides of the chain, as clearly shown in Fig. 8. As the bale in its inclined position rides over the upper edge of the closure plate 47, the bale will further tilt outwardly from the tower onto the chute 49. These arms 59, in their lifting position would of course be projecting through the slot 21 formed in the wall 18. As the chain carries the lifting arms over the upper sprocket, the lifting arms will drop downwardly in the position shown in Fig. 5.

In Figs. 1, 2 and 3, I have shown a method of mounting the conveyor in a building. Illustrated is a rail 70 on which is mounted a suitable trolley carriage 71 having rollers 72. Connected to this carriage 71 may be a suitable chain block embodying pulleys 73 and 74 traveling around which are the chains or belts 75. This chain block is illustrated as being connected by the hook 76 to an eyelet 78 mounted on the upper side 16 of the tower. It is believed obvious that, if desired, the carriage itself may be directly connected to the tower.

As shown in Fig. 2, the chain block is operated by the endless actuating chain 79.

The rail 70 may be mounted centrally of a barn or loft, or it may be mounted along the walls of the building or in any other desired location.

In this way I have provided a conveyor of this type consisting of a series of spaced apart lifting arms but comprising only one lifting arm at each location on the chain, with the mechanism so constructed that the lifting arm automatically moves into operative position on the upward movement, and into inoperative position on its downward movement. The mechanism has proven to be durable and highly efficient in use.

What I claim is:

A bale conveyor comprising a vertically disposed, tubular housing having a front wall, a rear wall and a pair of opposed side walls, one of said side walls having a vertical slot therein, said slot being closer to said front wall than to said rear wall, an endless chain extending vertically along said one side wall and having a lifting arm projectable into said housing through said slot, means for driving said endless chain whereby said lifting arm when projecting into said housing moves upwardly therein, said front wall having an inlet opening adjacent the bottom thereof, said rear wall having a discharge opening adjacent the top thereof, the space between said front and rear walls being greater than the width of a bale deposited therein whereby such bale may be tilted when conveyed, a loading platform affixed to said front wall at said inlet opening, said platform extending upwardly and outwardly from said front wall, an abutment projecting upwardly from the inner end of said platform, said abutment being disposed proximate to the vertical plane of said front wall, a bale being adapted to be placed on said platform and against said abutment and then moved into said housing, the upper end of the bale being directed against said rear wall whereby the bale assumes a tilted position relative to said housing, said lifting arm being adapted to engage the bottom of the bale and then elevate it while tilted whereby the bale slides along said rear wall until said discharge opening is reached whereupon the bale topples from said housing, said discharge opening being vertically elongate and having an upper end and a lower end, a closure plate for blocking off a portion of said lower end, and means connecting said closure plate to said rear wall for vertical adjustment relative thereto whereby the point of discharge of the bale can be varied.

References Cited in the file of this patent

UNITED STATES PATENTS

| | | |
|---|---|---|
| 975,721 | Russell | Nov. 15, 1910 |
| 988,822 | Rossin | Apr. 4, 1911 |
| 1,292,039 | Phillips | Jan. 21, 1919 |
| 2,615,554 | Huber | Oct. 28, 1952 |